July 14, 1931.  R. NELSON  1,814,450
FISH BAIT
Filed Oct. 20, 1928
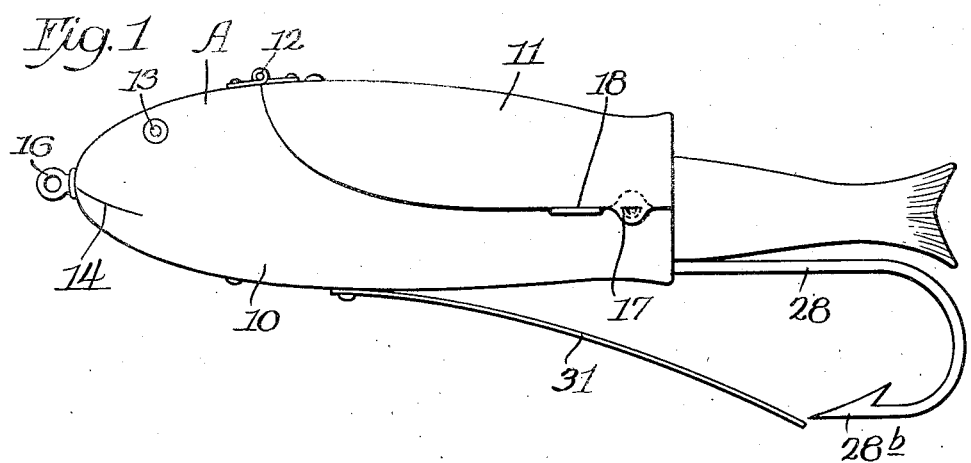
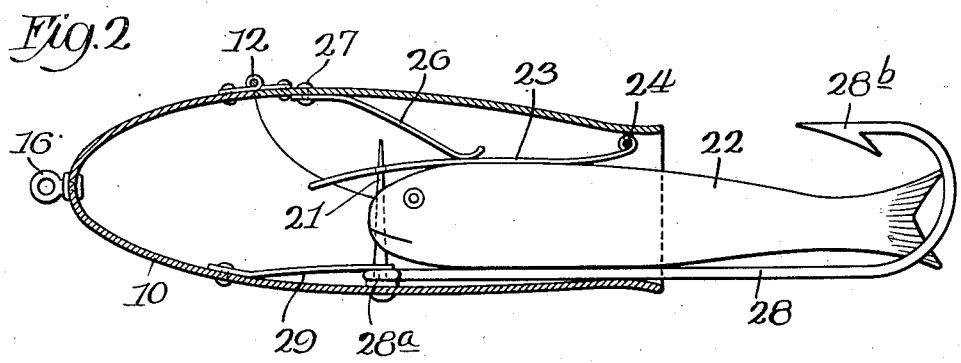
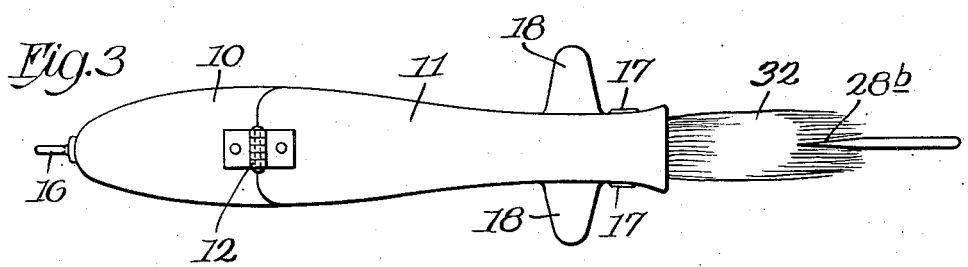
Inventor
Richard Nelson
By George E. Mueller Atty.

Patented July 14, 1931

1,814,450

UNITED STATES PATENT OFFICE

RICHARD NELSON, OF CHICAGO, ILLINOIS, ASSIGNOR OF ONE-HALF TO FRANK ROSNER, OF CHICAGO, ILLINOIS

FISH BAIT

Application filed October 20, 1928. Serial No. 313,675.

My invention relates to fish baits. It relates more in particular to an improved type of bait adapted to be used alone as a lure or with bait such as a live minnow or the like.

Among the objects of the invention is the provision of a bait which may be used with a live minnow, for example, without injury thereto.

Another object is the provision of a bait of this character in which any size of hook may be employed.

Another object is to employ the lure with or without bait.

Another object is the provision of a lure which may be used with any of the usual types of bait either live or inanimate.

Another object is the provision of a lure which may be employed for casting, trolling or still fishing.

Another object is the provision of a lure which will comply with game laws requiring humane hooks and only one hook.

Another object is to eliminate tackle baits so as to be able to get along with only one practicable bait.

Other objects and features of the invention will be apparent from a consideration of the detailed description taken with the accompanying drawings wherein Fig. 1 is a side elevational view showing one member of my invention;

Fig. 2 is a longitudinal vertical sectional view, and Fig. 3 is a plan view thereof with the live bait removed.

Refer now to the drawings. The invention comprises an artificial lure A having the general outline of a fish and adapted to be employed in a number of different ways depending upon the type of fishing which is being indulged in. This lure is hollow and is designed to receive bait which may be held therein without injury and in such a manner that a substantial portion of the bait projects from the open end of the hollow casing. Means is provided for securing a hook therein in removable relation thereto all in a manner which will be brought out in the detailed description.

The casing A has a body portion 10 and a top portion 11 secured thereto by a hinge 12, the portion 11 being cut away from the body portion in the manner shown, but cooperating with the body portion to form a fish like casing. This body is brightly colored to resemble in a general way the color of a fish and to carry out the illusion eyes 13 and a mouth 14 are provided. A screw eye 16 is provided for attaching the lure in the usual way to a line. At the rear of the casing friction means 17 is provided for preventing opening of the cover 11 except when desired. In order to control the movement of the lure through the water tail fins 18—18 are provided in the manner shown, these fins being adapted to be bent slightly to control the manner in which the lure is advanced through the water when drawn by the line.

On the inside of the body or casing a pin 21 is provided adapted to project sufficiently into the jaw of a fish 22 to hold the fish securely but still in a way as not to injure it. For compensating for fish of various sizes the cover 11 is provided with a retaining member 23 hinged to the bottom of the cover at 24 and pressed downwardly by a spring 26 secured to the cover by means of a rivet 27. With this arrangement it is obvious that it is necessary simply to open the cover, impale the fish on the pin 21 and then replace the cover, which immediately results in supporting the fish absolutely against removal from the lure and still without injury to the fish.

I also provide means for removably supporting a hook 28 within the casing and this may utilize separate retaining means but I prefer to extend the fish impaling pin 21 through the eye 28a of the hook, and then, in order to support the hook independent of its association with the fish I provide a spring pressed retainer 29 suitably secured to the casing in the manner shown.

The hook 28 can, as shown in the drawings, be used with its point 28b extending either upwardly or downwardly. When extending downwardly it may be advisable to provide a weedless attachment as in the form of a light spring 31 to prevent the catching of weeds on the point of the hook. Similar means may be provided at the top of the lure also if desired. When the lure is used without bait I may employ a removable plume 32 made either of feathers or hair to partially conceal the hook, this plume being secured on the pin 21 in the same manner in which the fish is secured.

With this arrangement it is obvious that I have a casing body made to represent a fish, or in other words formed according to the usual lure which is well known in the art. I may employ this lure alone but it may also be employed with animate or inanimate bait, and may be used for any of the usual styles of fishing including casting, trolling or still fishing.

While the details pointed out will enable those skilled in the art to practice the invention it is to be borne in mind that the invention is not restricted to such details but is limited only by the scope of the appended claims.

What I claim as new and desire to protect by Letters Patent of the United States is:

1. In a fish lure a hollow casing shaped and finished to suffice alone as a lure, means furnishing access to the inside of the casing, means for securing a hook within the casing so that it projects therefrom and means engaging the jaw of a live fish for fastening said fish therein for projection from the casing without injury to such bait.

2. In a fish lure a hollow casing shaped and finished to suffice alone as a lure, means furnishing access to the inside of the casing, means for securing a hook within the casing so that it projects therefrom, means for fastening live bait therein for projection from the casing without injury to such bait, and means for compensating for differences in size of the live bait.

3. In a fish lure a hollow casing shaped to simulate a fish, an upwardly projecting pin in the casing for penetrating the jaw of a fish without injury to the fish, and spring pressed means for holding the fish on said pin.

4. In a fish lure a hollow casing designed to be used alone as a lure with a hinged cover portion and with its rear end open, a pin in the bottom of the casing the inside thereof for extending through the lower jaw of a fish, and spring pressed means carried by the cover for holding the fish on said pin.

5. In a fish lure a hollow casing designed to be used alone as a lure with a hinged cover portion and with its rear end open, a pin in the bottom of the casing the inside thereof for extending through the lower jaw of a fish, spring pressed means carried by the cover for holding the fish on said pin, and means for supporting a hook from the inside of the casing.

6. As a new article of manufacture, a fish lure including a hollow casing simulating a body with an integral head, a hinged portion pivotally secured to the casing rearwardly of the head and adapted to be opened for the insertion of bait, and means carried by said hinged portion for positioning the bait.

In witness whereof, I hereunto subscribe my name this 28th day of September, 1928.

RICHARD NELSON.